United States Patent
Lichtman et al.

(10) Patent No.: US 7,106,969 B1
(45) Date of Patent: Sep. 12, 2006

(54) OPTICAL NETWORK TERMINATOR

(75) Inventors: Eyal Lichtman, Ramat Gan (IL); Erik Hendell, Tel Aviv (IL)

(73) Assignee: Atrica Israel Ltd., Herzelia (IL)

( * ) Notice: Subject to any disclaimer, the term of this patent is extended or adjusted under 35 U.S.C. 154(b) by 781 days.

(21) Appl. No.: 09/781,461

(22) Filed: Feb. 12, 2001

(51) Int. Cl.
  H04B 10/00 (2006.01)
  H04B 10/02 (2006.01)
  H04B 10/08 (2006.01)
  H04B 10/04 (2006.01)
  H04B 10/20 (2006.01)
  H04J 14/02 (2006.01)

(52) U.S. Cl. .................. 398/59; 398/37; 398/83; 398/158; 398/177; 398/194

(58) Field of Classification Search ............ 398/34, 398/37, 45, 48, 59, 61, 63, 65, 83, 120, 136, 398/149, 152, 158, 177, 194, 203–204
See application file for complete search history.

(56) References Cited

U.S. PATENT DOCUMENTS

| | | | | |
|---|---|---|---|---|
| 5,612,805 | A * | 3/1997 | Fevrier et al. | 398/83 |
| 5,812,710 | A * | 9/1998 | Sugaya | 385/27 |
| 5,986,800 | A * | 11/1999 | Kosaka | 359/341.41 |
| 6,067,187 | A * | 5/2000 | Onaka et al. | 359/337.11 |
| 6,094,296 | A * | 7/2000 | Kosaka | 359/341.41 |
| 6,226,425 | B1 * | 5/2001 | Chang-Hasnain et al. | 385/24 |
| 6,262,835 | B1 * | 7/2001 | Kosaka et al. | 359/337.12 |
| 6,321,003 | B1 * | 11/2001 | Kner et al. | 385/24 |
| 6,344,910 | B1 * | 2/2002 | Cao | 398/34 |
| 6,356,386 | B1 * | 3/2002 | Denkin et al. | 359/337 |
| 6,359,726 | B1 * | 3/2002 | Onaka et al. | 359/337.1 |
| 6,366,379 | B1 * | 4/2002 | Terahara et al. | 398/213 |
| 6,400,498 | B1 * | 6/2002 | Shimomura et al. | 359/341.1 |
| 6,466,348 | B1 * | 10/2002 | Izumi | 398/177 |
| 6,483,636 | B1 * | 11/2002 | Sugaya et al. | 359/349 |

(Continued)

OTHER PUBLICATIONS

IP T1 Product Brochure, Engage Communication, Not dated.

(Continued)

*Primary Examiner*—Dalzid Singh
(74) *Attorney, Agent, or Firm*—Zaretsky & Associates PC; Howard Zaretsky (57) ABSTRACT

An optical network terminator for terminating and reducing the accumulated noise in optical networks, particularly ring based networks. The terminator eliminates problems of noise accumulation from amplifier spontaneous emission (ASE), thermal noise, etc., while providing bi-directional communications in the optical network. The optical network may have any topology including ring, star, mesh, point-to-point, etc. In the case of an optical ring, the ring is broken and an optical terminator is placed in line therewith. The optical network terminator includes a filer such as an optical demultiplexer/multiplexer or Fiber Bragg Grating (FBG) based filter. Each individual wavelength of light is filtered and a multi-wavelength optical output is generated whereby the noise accumulation is removed. Each channel is adapted to only pass a band-limited signal around the center frequency corresponding to the wavelengths supported by the particular optical ring network. Channel equalization uses variable optical attenuators and monitors in line with each channel. Channels currently not in use may be disconnected from the ring remotely by setting the corresponding optical attenuator to a low enough level.

8 Claims, 8 Drawing Sheets

U.S. PATENT DOCUMENTS

| | | | |
|---|---|---|---|
| 6,496,619 B1 * | 12/2002 | Naganuma | 385/27 |
| 6,515,777 B1 * | 2/2003 | Arnold et al. | 398/97 |
| 6,519,060 B1 * | 2/2003 | Liu | 398/49 |
| 6,529,317 B1 * | 3/2003 | Choi et al. | 359/341.31 |
| 6,549,314 B1 * | 4/2003 | Yamaguchi | 398/68 |
| 6,580,550 B1 * | 6/2003 | Kosaka et al. | 359/337.1 |
| 6,594,046 B1 * | 7/2003 | Nishino | 359/337 |
| 6,624,926 B1 * | 9/2003 | Hayashi et al. | 359/334 |
| 6,626,590 B1 * | 9/2003 | Nagatsu et al. | 398/59 |
| 6,643,055 B1 * | 11/2003 | Askinger et al. | 359/337.12 |
| 6,646,795 B1 * | 11/2003 | Jones et al. | 359/349 |

OTHER PUBLICATIONS

Stein, Y. et al., "Circuit Extension Over IP", RAD Data Communications, http://www.tdmoio.com/wp_ceoip.htm, pp. 1-13, Not dated.

Alcatel to acquire Innovative Fibers, the world leader in DWDM optical filter technology, Alcatel, Jul. 5, 2000.

Grubsky, V. et al., "Wavelength-Selective Coupler and Add-Drop Multiplexer Using Long-Period Fiber Gratings", D-STAR Technologies, Inc., Not dated.

* cited by examiner

OPTICAL NETWORK TERMINATOR

FIELD OF THE INVENTION

The present invention relates generally to optical data communications and more particularly relates to an optical network terminator for terminating an optical based network.

BACKGROUND OF THE INVENTION

Optical communication systems are becoming more and more widespread mainly due to their very large information carrying bandwidths. The growth and diversity of lightwave networks, such as Wavelength Division Multiplexed (WDM) networks are placing new demands on all aspects of optical networks including, for example, capacity management and provisioning, maintenance, and reliable and robust operation. In addition, the current trend in many carrier networks is to implement standard IP based networks to achieve convergence of traditionally separate voice and data networks. To this end, the use of Ethernet based equipment in implementing carrier networks is becoming increasingly common.

Currently, high capacity optical networks are constructed as rings and use WDM technology to achieve high bandwidth capacities. For example, WDM ring networks are commonly used in metropolitan area network (MAN) applications but can also be used in LANs and WANs.

Figure 1:
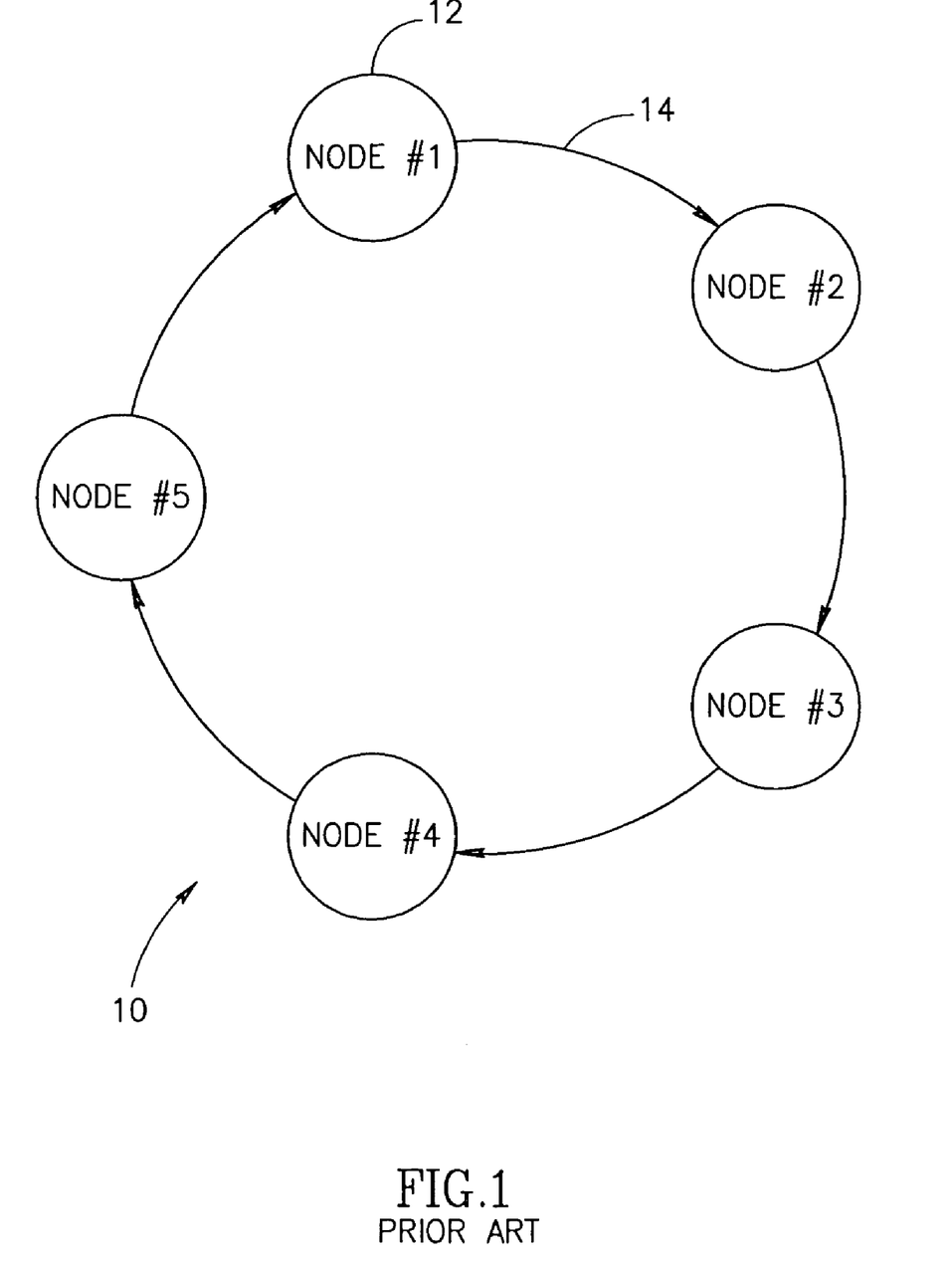
FIG. 1 is a block diagram illustrating an example prior art optical ring network comprising a plurality of nodes.

A block diagram illustrating an example prior art optical ring network comprising a plurality of nodes is shown in FIG. 1. The optical network, generally referenced 10, comprises a plurality of nodes 12, labeled node #1 through #5, connected by optical fiber links 14 so as to form an optical ring network. The ring network is characterized by communications that take place from node to node. In this example network, only a single ring is shown such that communications proceeds in the clockwise direction only. A second ring can be implemented that carries communications between nodes in the opposite or counter-clockwise direction.

Wavelength division multiplexed (WDM) optical networks are particularly desirable because of their restoration capabilities and suitability for minimizing the optical fiber length for the interconnection of system nodes. A typical WDM optical ring network includes network elements with optical add/drop multiplexers (OADMs), whereby some optical channels are dropped, some are added and/or other channels are expressed or passed through.

In a ring topology each ring node is connected to exactly two other ring nodes. The OADMs are used to construct a ring network whereby adjacent OADMs are connected pair wise while the network nodes are situated to form a ring. In a ring network, any node can be reached from any other node using two physically separate paths, i.e. one traveling clockwise and the other counter clockwise. The opposite traveling paths are used to provide protection against route failures. The use of at least two parallel fibers with traffic flowing in opposite directions provides restoration capabilities in the event of a fiber cut.

An Add/Drop Optical Multiplexer (ADOM) functions to filter or drop one or more wavelengths transmitted on the ring. The optical technologies typically used for producing an ADOM can be placed in two main categories, namely: (1) those using fixed filtering, whereby an ADOM is produced for dropping and adding a fixed wavelength, and (2) those using tunable filtering, whereby an external control determines the wavelength of the dropped and added channel.

Normally, only a single wavelength of light is used to carry optical signals from one node to another. To increase the communications bandwidth of the network, however, it is common to transmit light signals having multiple wavelengths. Additional signal channels can be added, wherein each channel corresponds to a different wavelength of light, using well-known DWDM techniques.

Figure 2A:
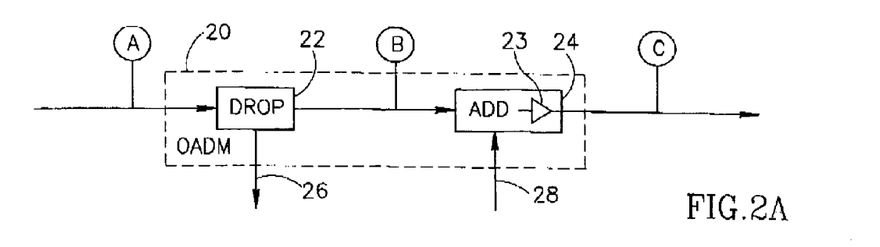
FIG. 2A is a block diagram illustrating a typical structure of an Optical Add/Drop Multiplexer (OADM)

As is common practice in DWDM optical networks, optical add/drop multiplexers (OADMs) are used to drop, add or express one or more optical channels. A block diagram illustrating a typical structure of an Optical Add/Drop Multiplexer (OADM) is shown in FIG. 2A. The OADM, generally referenced 20, comprises drop module 22 adapted to generate a drop channel 26 from the multi-wavelength input signal and an add module 24, incorporating an optical amplifier 23, adapted to add a channel 28 to the multi-wavelength output signal.

A problem associated with such types of optical networks is the losses incurred from the passive optical devices, such as filters, couplers, multiplexers, etc. The losses, which exist at every node on the network, can increase as the number of optical components increases, such as in networks with large numbers of nodes, To overcome the problem of optical losses from passive components, active optical amplifiers are used along the optical ring to boost the weak optical signals. Commonly used optical amplifiers include Erbium Doped Fiber Amplifiers (EDFAs). The use of optical amplifiers, however, is problematic. The amplifiers function to boost not only the optical signals but also any noise present. In addition, the optical amplifiers add noise to the line in addition to the signal and to the noise already present.

In non-ring type networks, techniques are well known for reducing the effects of the noise. In an optical ring network, however, the use of active optical amplifiers causes noise accumulation from amplifier spontaneous emissions (ASE) and from other noise sources as well, and is commonly referred to as noise creep.

Figure 2B:
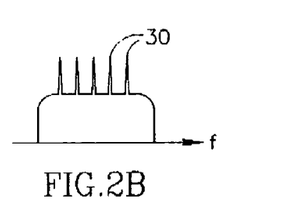
FIGS. 2B through 2G are signal graphs illustrating the phenomenon of amplifier noise accumulation.
Figure 2C:
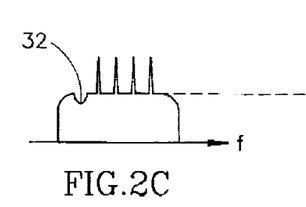
Figure 2D:
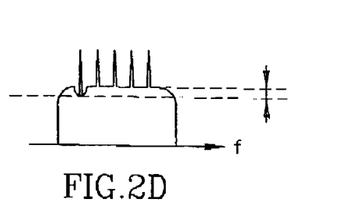

Signal graphs illustrating the phenomena of ASE and noise build up or amplifier noise accumulation are shown in FIGS. 2B through 2G. The graphs correspond to points A, B and C shown in FIG. 2A. Each node along the ring employs at least one OADM 20. FIGS. 2B, 2C and 2D correspond to the baseline optical signal levels along the ring at points A, B and C, respectively. Similarly, FIGS. 2E, 2F and 2G correspond to the optical signal levels after a complete revolution around the ring at points A, B and C, respectively.

In each figure, the relative amplitude is plotted as a function of frequency (i.e. wavelength). The five peaks 30 in relative amplitude correspond to five different wavelengths in use along the ring. For illustration purposes the OADM 20 corresponds to the lowest frequency. With reference to the figures, at point A, all five wavelengths are present in the signal. Since the drop module functions to filter out a single wavelength 32, the signal at point B has the first wavelength filtered out. The add module employs an active amplifier to boost the optical signal with the new channel added. Thus, the signal at point C comprises the five wavelengths amplified. In addition, however, the noise level is also amplified by an amount $\Delta N_1$ where N represents the noise added to the signal each loop around the ring.

Figure 2E:
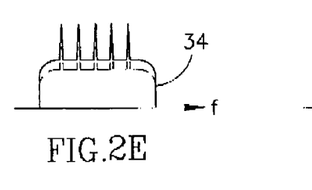
Figure 2F:
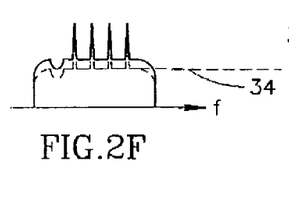
Figure 2G:
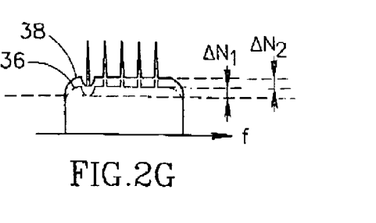

FIG. 2E illustrates the optical signal at the same point A after traversing the loop. The wavelength peaks are present along with an elevated noise floor. The original signal as shown in FIG. 2B is indicated by dotted line 34. After wavelength filtering by the drop module, the first wavelength is removed as shown in FIG. 2F. A channel is then added and the resulting signal amplified as shown in FIG. 2G. As in FIG. 2D, the noise along with the signal is amplified. The noise level also rises by an additional amount $\Delta N_2$ to a level indicated by line 38. The noise level at point C from the previous loop is indicated by line 36 while the original noise level at point A is indicated by line 34.

Thus, after two loops around the ring, the noise level has increased to a level equal to $\Delta N_1 + \Delta N_2$. Considering even small amounts of amplifier noise, it can be seen that the effects of noise creep can amount to significant levels of noise after only relatively few trips around the ring. Eventually, the noise caused by amplifier noise and other noise source accumulation increases sufficiently to saturate the amplifier and communications along the optical ring becomes impossible.

Figure 3:
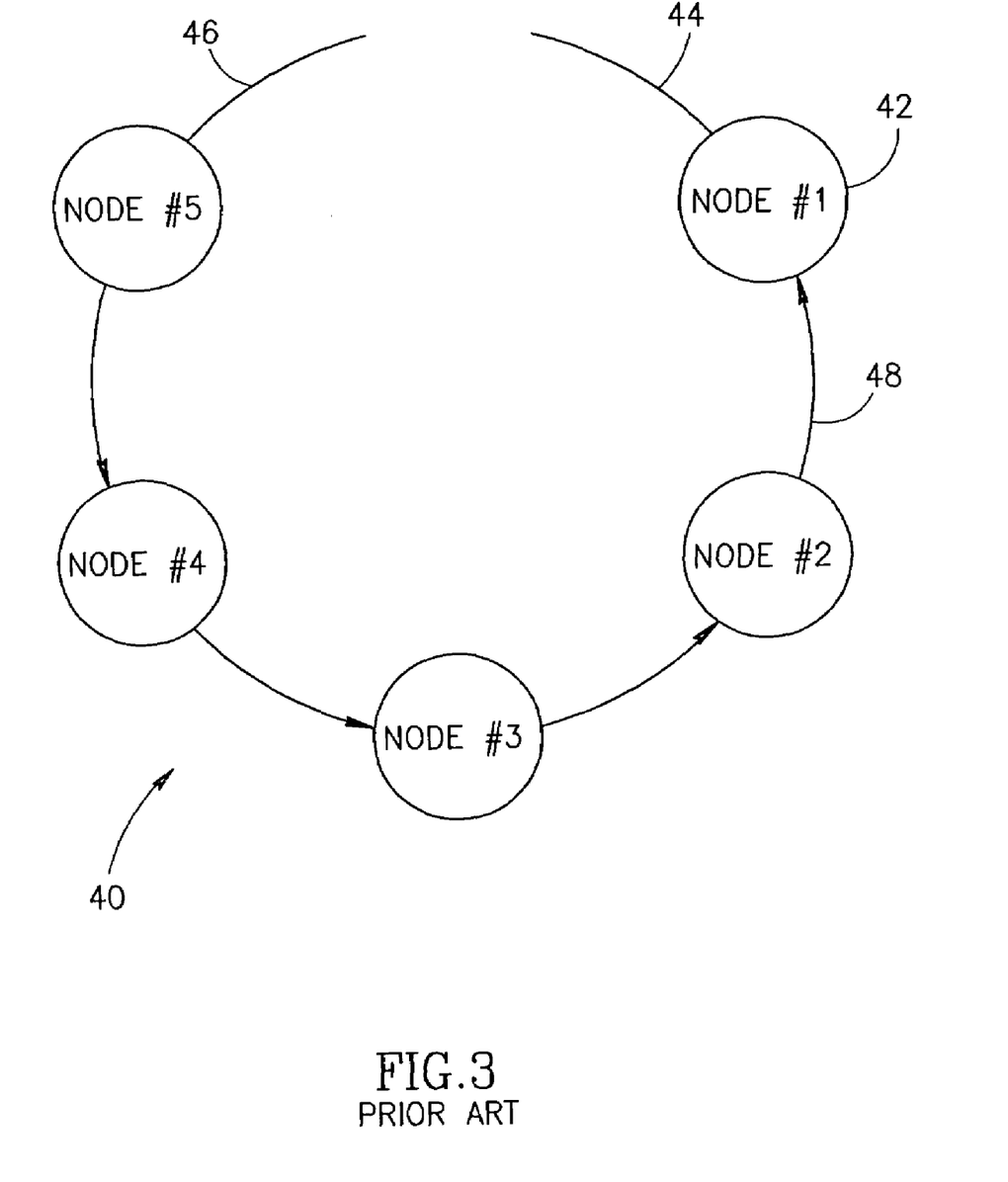
FIG. 3 is a block diagram illustrating a prior art optical ring network that attempts to solve the amplifier noise accumulation problem.

One prior art solution to this problem is to open the optical ring. A block diagram illustrating a prior art optical ring network that attempts to solve the amplifier noise accumulation problem is shown in FIG. 3. The example network, generally referenced 40, comprises five nodes 42, labeled node #1 through node #5, connected by link 48. The link between nodes #1 and #5 is severed leaving two stubs 46, 44. The problem of noise creep is eliminated since the optical signal begins and terminates within a single rotation.

A disadvantage of this solution is that the ring properties of the network are destroyed. Communications around the ring can only take place in one direction. Thus, one half of the bandwidth is lost. For example, in a closed ring, two nodes normally can communication with each other in two directions, clockwise and counter-clockwise directions of communications. The network 40, however, only supports unidirectional communications. Bi-directional communications is a very desirable characteristic and a major benefit of employing optical networks in ring configuration.

A solution to this is to normally maintain the ring in an open state and to close it only when necessary such as during a fiber cut or other failure along the ring. This requires adding means to the network operative to detect fiber cuts and to close the ring in response thereto.

Figure 4:
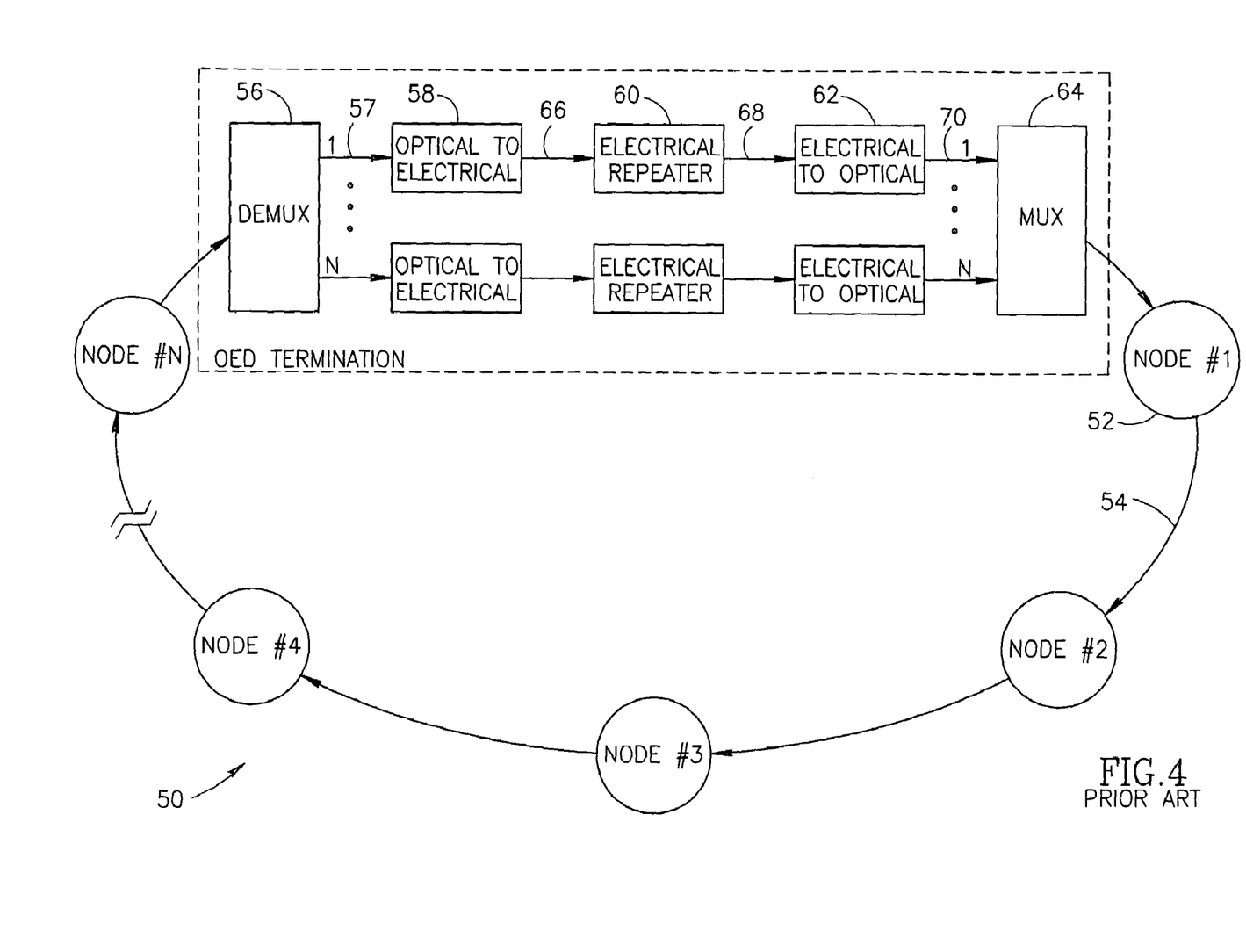
FIG. 4 is a block diagram illustrating a prior art Optical Electrical Optical (OEO) termination module.

An alternative prior art solution to the problem of noise creep is to break the loop and insert an electrical based repeater to regenerate the signal in the electrical domain. The repeater functions to convert the signal from optical to electrical and back to optical. A block diagram illustrating a prior art Optical Electrical Optical (OEO) termination module is shown in FIG. 4. The network, generally referenced 50, comprises a plurality of nodes 52, labeled node #1 through node #N, connected by optical links 54.

The ring is broken and an Optical/Electrical/Optical (OEO) termination is inserted. The OEO terminator comprises an optical demultiplexer 56, optical multiplexer 64, optical to electrical converters 58, electrical repeaters 60 and electrical to optical converters 62. In operation, the optical signal received by the demultiplexer is divided into N optical signals 57 each having a different wavelength. Each individual channel is then converted from the optical domain to the electrical domain by optical to electrical converter 58 to yield an electrical signal 66.

The electrical signal is then amplified and regenerated to yield a regenerated electrical signal 68. This signal is then converted to an optical signal 70 by electrical to optical converter 62. The optical signals output from the N converters 62 are multiplexed by multiplexer 64 into a composite multi-wavelength optical signal that is then transmitted to the first node on the ring.

A benefit of electrical regeneration of the signal is that the noise is cleaned from the ring. In addition, each individual channel is accessible electrically for any purpose. A disadvantage of this solution, however, is that it is relatively costly in terms of complexity and the requirement to add optical and electrical based hardware to the ring. The electrical based equipment must be managed, adding to the cost and complexity. In addition, the equipment typically consumes a large amount of space. Further, the use of additional electrical equipment lowers the overall reliability of the network as it is another potential point of failure.

Therefore, there is a need for a solution to amplifier noise accumulation in optical ring networks that does not require costly, complex electro/optical based hardware and that provides the bi-directional communications benefit of ring networks.

SUMMARY OF THE INVENTION

The present invention comprises an optical network terminator for terminating an optical network. The invention is applicable to optical networks having any kind of topology such as optical ring networks, point-to-point networks, mesh networks, star networks, etc. Further, the invention comprises a filter that can be implemented using any suitable technology such as multiplexer/demultiplexer, Fiber Bragg Grating (FBG) based filters, etc. In addition, the invention is not limited to the type of wavelength content. The optical network may implement Dense Wavelength Division Multiplexing (DWDM), WDM, Coarse Wavelength Division Multiplexing (CWDM), Wide Wavelength Division Multiplexing (WWDM), etc., a specific wavelength or can be any type of non-WDM based network. Use of the present invention eliminates the prior art problems of noise accumulation regardless of its source, such as Amplifier Spontaneous Emission (ASE) noise, thermal noise, noise due to non-linear effects, etc.

To aid in understanding the principles of the present invention, the invention is described in the context of an optical ring network. It is appreciated that the invention is not limited to the example optical networks presented but can be applied to any type of optical network.

The optical terminator is operative to overcome the problems associated with the prior art by breaking the link between two nodes and placing an optical noise filtering mechanism, termed an 'optical network terminator,' therebetween. For example, in the case of an optical ring network, the invention breaks the ring and places the optical terminator between two nodes. The 'optical terminator' denotes any suitable filtering mechanism including but not limited to an optical demultiplexer coupled to an optical multiplexer, optical add/drop multiplexer, Fiber Bragg Gratings, polarization based devices, etc. It is appreciated, however, that other types of optical filtering schemes may be used without departing from the scope of the invention. The 'optical terminator' functions to filter each individual wavelength of light and generate a multi-wavelength optical output with the accumulation of noise removed, including amplifier noise. The filtering out of the noise accumulation occurs in the optical domain without the need for optical to electrical and electrical to optical conversion. The filter, e.g., combination of optical demultiplexer and multiplexer (or any other optical filtering method), functions to pass for each channel a 'cleaned' signal wherein the noise has been removed.

The invention also provides a means to add optical features to a system in a seamless manner. Features such as equalizing the optical power between WDM channels. Equalization of the channels is achieved by placing variable optical attenuators and monitors in line with each channel. The invention also enables the remote disconnection from the ring of channels currently not in use. Disconnecting unused channels aids in reducing cross talk between channels. A channel is disconnected by reducing the gain of the corresponding attenuator sufficiently such that the channel is effectively removed from the optical ring.

There is therefore provided in accordance with the present invention a method of optical network termination in an optical network having one or more channels each potentially corrupted with noise, the method comprising the steps of receiving one or more input optical signals transmitted over the one or more channels of the optical network, filtering the one or more input optical signals so as to remove any accumulated noise and outputting the output optical signal onto the one or more channels on the optical network.

There is also provided in accordance with the present invention an optical network terminator for terminating an optical network comprising a receiver for receiving one or more multi-channel optical input signals, an optical demultiplexer operative to demultiplex each the input multi-channel optical signal into a plurality of individual optical channels, each the optical channel having a unique wavelength, an optical multiplexer operative to multiplex the plurality of individual optical channels so as to generate one or more output multi-channel optical signals with any accumulated noise removed and a transmitter for outputting the one or more output multi-channel optical signals.

There is further provided in accordance with the present invention an optical network comprising a plurality of nodes, wherein a portion of the nodes employs one or more optical amplifiers, an optical network terminator for terminating the optical network, wherein the optical network terminator comprises one or more optical receiving ports for receiving input single or multi-channel optical signals, an optical demultiplexer operative to demultiplex each the input multi-channel optical signals into a plurality of individual optical channels, each the optical channel having a unique wavelength, an optical multiplexer operative to multiplex the plurality of individual optical channels so as to generate an output multi-channel optical signal with any noise accumulation removed and one or more optical transmitting ports adapted to output the output single or multi-channel optical signal.

There is also provided in accordance with the present invention an optical ring network comprising a plurality of nodes situated around the optical ring, wherein a portion of the nodes employs one or more optical amplifiers, an optical network terminator for terminating the optical ring network, wherein the optical network terminator comprises an optical receiver for receiving an input multi-channel optical signal, an optical demultiplexer operative to demultiplex the input multi-channel optical signal into a plurality of individual optical channels, each the optical channel having a unique wavelength, a plurality of optical attenuators, each optical attenuator coupled in-line to an individual optical channel, the optical attenuator operative to very the optical gain of an optical signal, a plurality of monitors, each monitor coupled in-line to an individual optical channel, the monitor operative to measure the optical power of an optical signal, an optical multiplexer operative to multiplex the plurality of individual optical channels so as to generate an output multi-channel optical signal with any noise accumulation removed and an optical transmitter adapted to output the output multi-channel optical signal.

There is still further provided in accordance with the present invention a method of optically terminating an optical network having one or more channels, the method comprising the steps of receiving an input optical signal containing a single channel and having wavelength associated therewith, filtering the input optical signal to remove unwanted noise and to generate an output optical signal therefrom and outputting the output optical signal.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ADOM | Add Drop Optical Multiplexer |
| ASE | Amplifier Spontaneous Emission |
| ASIC | Application Specific Integrated Circuit |
| CPU | Central Processing Unit |
| DSP | Digital Signal Processor |
| WWDM | Wide Wavelength Division Multiplexing |
| CWDM | Coarse Wavelength Division Multiplexing |
| DWDM | Dense Wavelength Division Multiplexing |
| EDFA | Erbium Doped Fiber Amplifiers |
| EEROM | Electrically Erasable Read Only Memory |
| FBG | Fiber Bragg Grating |
| FPGA | Field Programmable Gate Array |
| IP | Internet Protocol |
| LAN | Local Area Network |
| MAN | Metropolitan Area Network |
| OADM | Optical Add Drop Multiplexer |
| OBPF | Optical Band Pass Filter |
| OEO | Optical Electrical Optical |
| RAM | Random Access Memory |

-continued

The following notation is used throughout this document.

| Term | Definition |
|---|---|
| ROM | Read Only Memory |
| WAN | Wide Area Network |
| WDM | Wavelength Division Multiplexing |

DETAILED DESCRIPTION OF THE INVENTION

The present invention comprises an optical network terminator for terminating an optical network and removing unwanted noise accumulation. The invention is applicable to optical networks having any kind of physical or logical topology such as optical ring networks, point-to-point networks, mesh networks, star networks, etc. For example, in an optical ring network, a point-to-point network, etc. a relatively large amount of noise may accumulate along a very long distance span between two nodes. Further, mesh type networks may comprise one or more sub-rings wherein each sub-ring comprises an optical terminator of the present invention.

Further, the invention comprises a terminator that can be implemented using any suitable technology such as multiplexer/demultiplexer combination, Fiber Bragg Grating (FBG) based filters, Optical Band Pass Filters (OBPFs), filters based on polarization based devices, etc. In addition, the invention is not limited to the type of wavelength content. The optical network may implement Dense Wavelength Division Multiplexing (DWDM), WDM, CWDM, WWDM, etc., a specific wavelength or can be any type of non-WDM network as well. Use of the present invention eliminates the prior art problems of noise accumulation regardless of its source, such as Amplifier Spontaneous Emission (ASE) noise, thermal noise, noise due to non-linear effects, etc.

To aid in understanding the principles of the present invention, the invention is described in the context of a multi-channel optical ring network. It is appreciated that the invention is not limited to the example optical networks presented but can be applied to any type of physical optical network that is adapted to implement any type of logical network, e.g., star, mesh, etc. For example, a ring network may be adapted to implement a star or mesh network by appropriately configuring the nodes and transmission wavelength assignments.

The example network described herein employs a plurality of nodes wherein each node employs one or more OADMs, each corresponding to a single wavelength. The network also employs optical amplifiers such as Erbium Doped Fiber Amplifiers (EDFAs), for example. Throughout this document, the term add drop multiplexer denotes transmission equipment that functions to add and drop information from an optical ring to and from one or more switching elements.

Although the invention is presented in the context of an example optical ring network, it is appreciated that the invention can be applied to optical networks of any type of topology comprising any number of nodes and OADMs, any type of optical amplifiers and any type of noise (i.e. undesirable optical signal). Note that the invention is not limited to optical ring type networks but can be applied to other types of networks as well. It is not intended that the invention be limited to the configurations and example embodiments described herein. It is appreciated that one skilled in the art may apply the principles of the present invention to numerous other types of optical network configurations without departing from the spirit and scope of the invention.

In the context of the example optical ring network presented herein, the invention overcomes the problems associated with the prior art by virtually breaking the ring and virtually placing an optical terminator in line with the optical signal. It is important to note that in contrast to prior art electronic ring termination which is a physical termination, the optical network termination of the present invention is a logical termination only since the signal remains in the optical domain and is not converted to the electrical domain.

Figure 5:
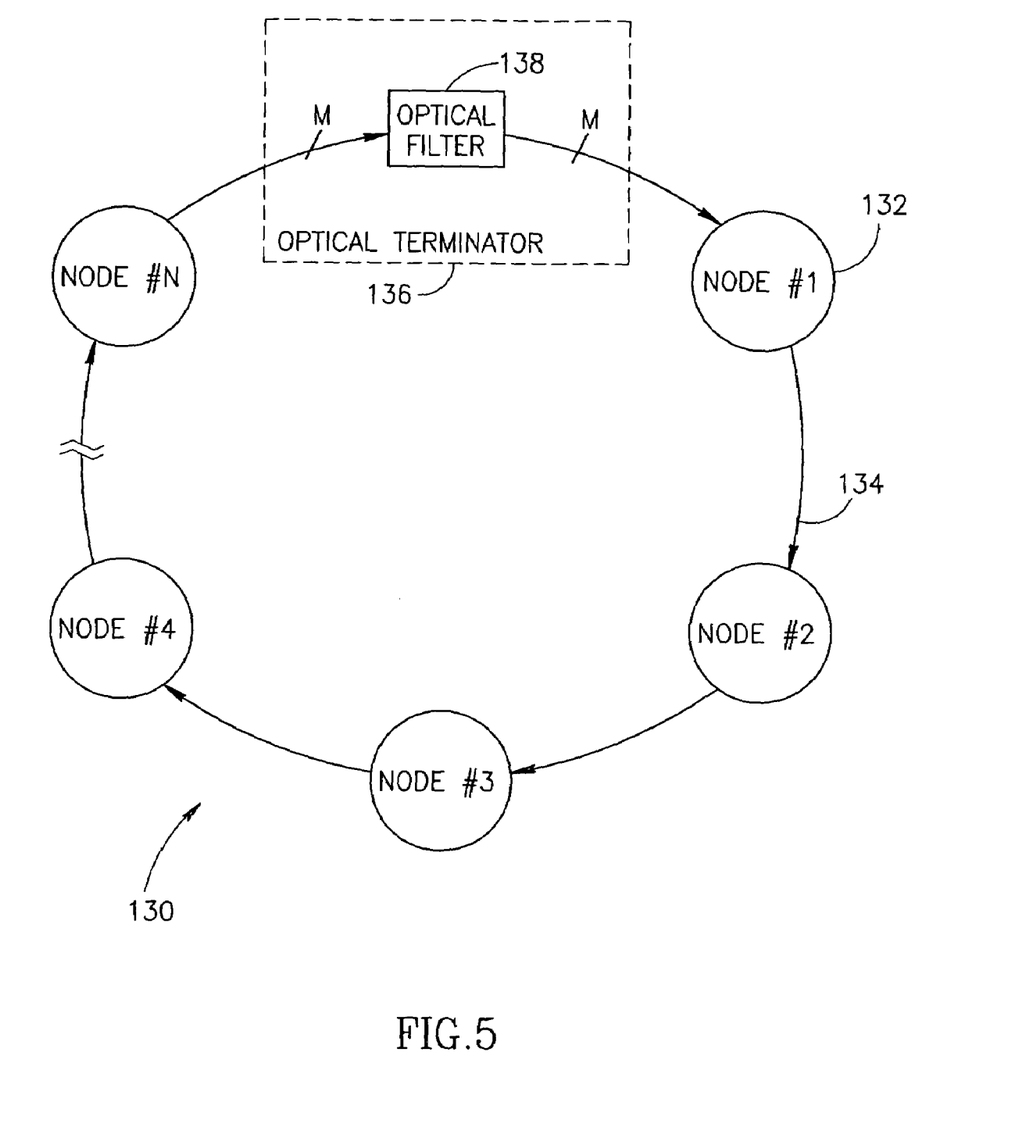
FIG. 5 is a block diagram illustrating an example optical network employing the optical network terminator constructed in accordance with the present invention.

A block diagram illustrating an example optical network employing the optical network terminator constructed in accordance with the present invention is shown in FIG. 5. The optical network, generally referenced 130, comprises a plurality of nodes 132, labeled node #1 through node #N, connected by optical links 134.

In accordance with the present invention, the optical network is virtually broken and an optical network terminator 136 is virtually placed in line with the signal. Note that the particular location of virtually breaking the network is not critical to the operation of the invention.

The 'optical terminator' 136 comprises an M channel optical filter 138. The optical terminator functions to remove amplifier spontaneous emissions (ASE) noise, thermal noise, noise due to non-linearities, etc. and any other type of noise by filtering the optical signal. In a WDM based network, each individual wavelength of light is filtered and a multi-wavelength optical output is generated with the noise accumulation removed. The cleaned optical signals are then output as a multi-wavelength output signal.

Note that any suitable filtering mechanism may be used as long as it is effective to remove the ASE and other types of noise. For example, the filter may comprise a demultiplexer/multiplexer combination, wavelength selective coupler, Optical Add/Drop Multiplexer, Fiber Bragg Gratings (FBG) based filter, polarization devices such as wideband isolators that can isolate a particular wavelength, a filter implemented using polarization, etc.

An FBG based optical filter suitable for use with the present invention is Part Number FBG-ITU-99-0.8S, manufactured by Innovative Fibers Inc., Gatineau, Quebec, Canada. Note that a plurality of FBG based filters, each adapted to filter a particular wavelength, can be cascaded in parallel or placed in series combination so as to cover multiple wavelengths.

Other optical filters suitable for use with the present invention include a fiber Fabry-Perot optical filter, Part Number FFP-TF, manufactured by Micron Optics Inc., Atlanta, Ga.; a Mach-Zehnder optical filter, AmpFlat Part Number AFF-1550-ABC99-0, manufactured by Photonic Technologies, Eveleigh, Australia; Acousto-Optic-Tunable-Filter, Infrared Fiber Optics—AOTF.

A polarization based filter suitable for use with the present invention is the PolarWave Optical Slicer 50G Filter manufactured by Chorum Technologies, Richardson, Tex.

The filter functions to only pass for each channel a band limited signal around the center frequency corresponding to the wavelengths supported by the particular network. An important aspect of the invention is that the filtering out of the noise accumulation occurs in the optical domain without the need for optical to electrical converters, electrical repeaters and electrical to optical conversion. Note that the terminator may be constructed to handle any number M of channels using a suitably adapted filter.

Figure 6:
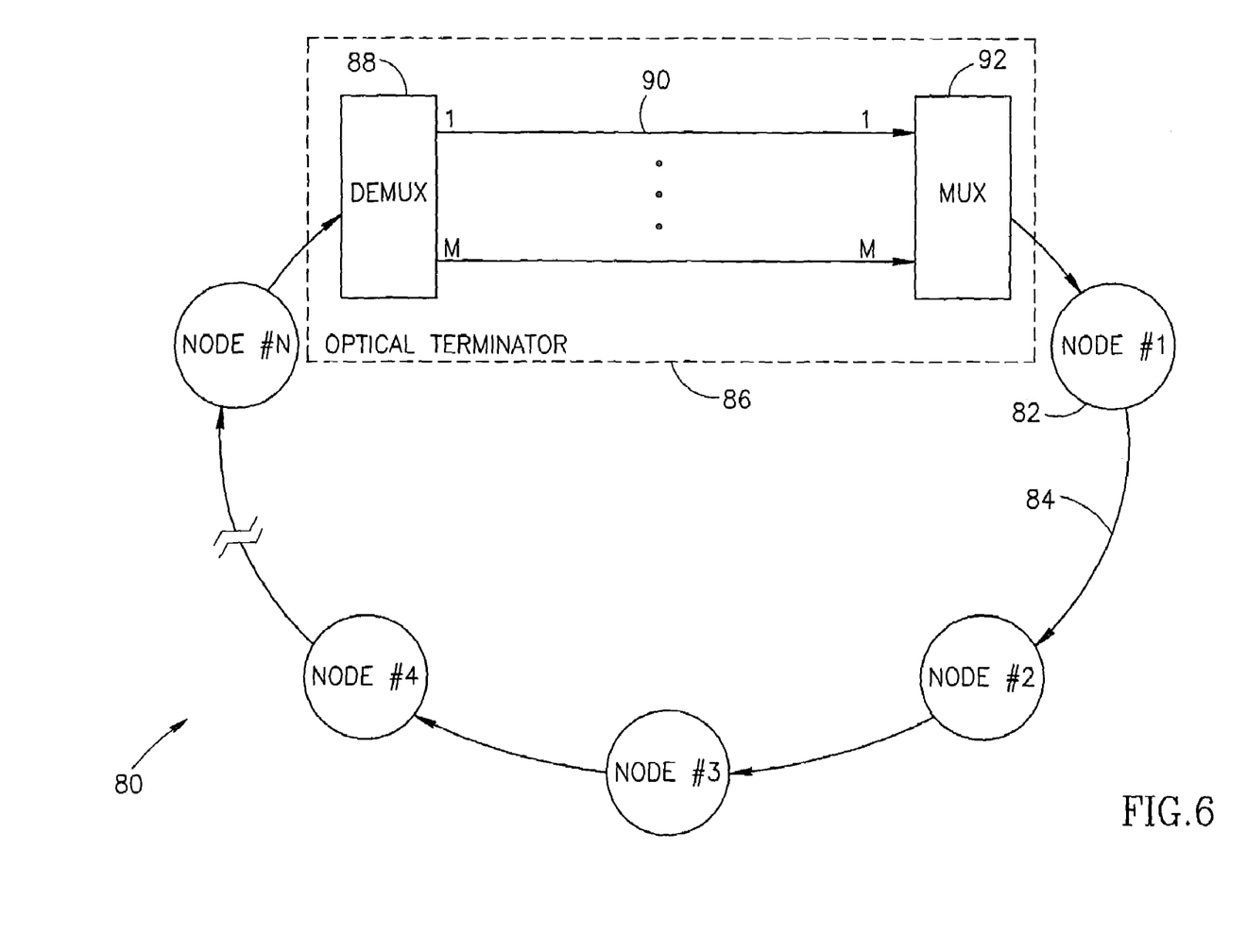
FIG. 6 is a block diagram illustrating an example optical ring network employing the optical network terminator constructed in accordance with the present invention.

A block diagram illustrating an example optical ring network employing the optical network terminator constructed in accordance with the present invention is shown in FIG. 6. The optical ring network, generally referenced 80, comprises a plurality of nodes 82, labeled node #1 through node #N, connected by optical links 84.

In accordance with the present invention, the optical ring is virtually broken and an optical based network terminator 86 is virtually placed in line with the signal. Note that the particular location of virtually breaking the ring is not critical to the operation of the invention.

The optical network terminator 86 comprises an M output optical demultiplexer 88 coupled to an M input optical multiplexer 92 via a plurality of optical cables 90. The optical network terminator functions to remove the amplifier spontaneous emissions (ASE) noise and any other type of noise by filtering the optical signal. Each individual wavelength of light is filtered and a multi-wavelength optical output is generated with the amplifier noise accumulation and/or any other type of noise removed. The cleaned optical signals are then multiplexed to generate a multi-wavelength output signal.

Note that if the optical signal comprises only a single channel, the demultiplexer and multiplexer can be replaced with a filter that performs the same filtering function. Any suitable filtering mechanism may be used as long as it is effective to remove the ASE and other types of noise.

The combination of optical demultiplexer and multiplexer functions for each channel to only pass a band limited signal around the center frequency corresponding to the DWDM wavelengths supported by the particular ring network. The filtering out of the noise accumulation occurs in the optical domain without the need for optical to electrical converters, electrical repeaters and electrical to optical conversion.

Note that the optical network terminator may be constructed to handle any number M of channels using either single or multiple pairs of demultiplexers and multiplexers. Note also that devices other than optical demultiplexers can be employed to perform the optical filtering function, such as ADOM, FBG, OBPF, polarization based isolators and filters, etc.

Figure 7A:
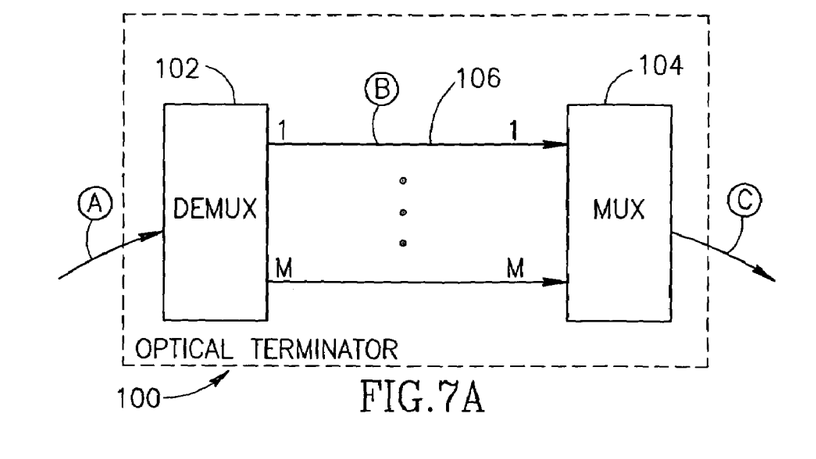
FIG. 7A is a block diagram illustrating the optical network terminator of the present invention with several optical signal points identified.

A block diagram illustrating the optical network terminator of the present invention with several optical signal points identified is shown in FIG. 7A. The optical network terminator, generally referenced 100, comprises an M output demultiplexer 102 and M input multiplexer 104 connected to each other by optical fiber cables 106.

Figure 7B:
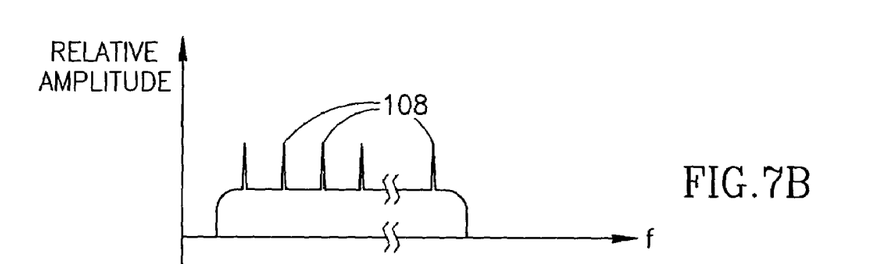
FIGS. 7B through 7D are signal graphs illustrating the elimination of amplifier noise accumulation using the optical network terminator of the present invention.
Figure 7C:
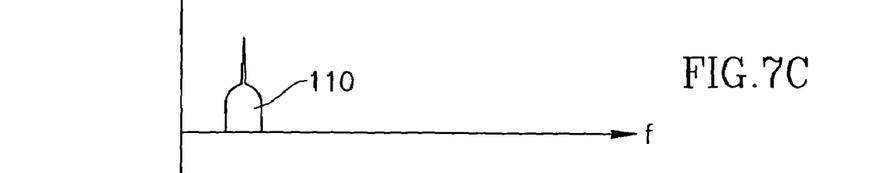
Figure 7D:
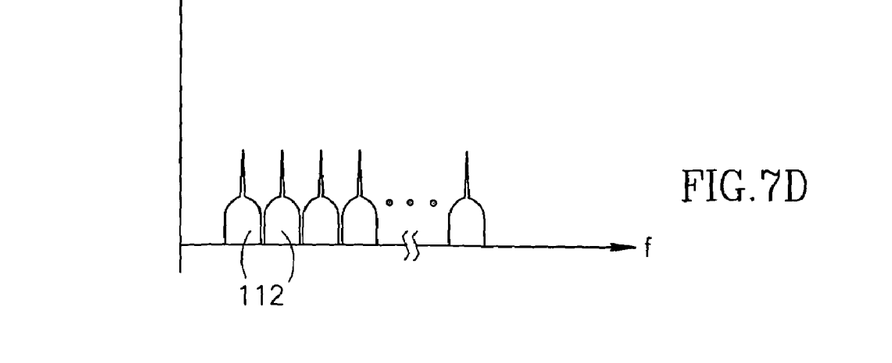

Signal graphs illustrating the elimination of amplifier noise accumulation using the optical network terminator of the present invention are shown in FIGS. 7B through 7D. FIGS. 7B, 7C and 7D correspond to the signal present at points A, B and C, respectively, shown in FIG. 7A.

In each figure, the relative amplitude is plotted as a function of frequency (i.e. wavelength). FIG. 7B illustrates the multi-channel signal input to the demultiplexer 102. Each peak 108 in relative amplitude corresponds to a unique DWDM wavelength in use along the ring. The demultiplexer 102 functions to filter out all but a single wavelength from the input signal. The is illustrated in FIG. 7C wherein all but a single peak 110 is filtered from the input. The optical demultiplexer is operative to only pass for each channel a band limited signal around the center frequency corresponding to a particular DWDM wavelength.

Thus, the optical demultiplexer functions to remove the ASE noise, thermal noise, effects due to non-linearities, etc. and any other applicable noise from the optical ring. Subsequently, the multiplexer 104 functions to combine the M channels into a single multi-channel output signal as shown in FIG. 7D. Each individual channel 112 comprises a band-limited signal with the amplifier noise accumulation filtered out.

Thus, upon each pass through the ring, the noise including amplifier noise is removed, thus preventing the loss of communications due to noise creep. It is noted that only one 'optical terminator' is needed on an optical ring in order to prevent the accumulation of amplifier noise and all other applicable noise.

In addition to the elimination of noise creep, the invention also comprises additional embodiments that provide additional functionality such as line equalization, line monitoring and remote line disconnection, as described in more detail hereinbelow.

Figure 8:
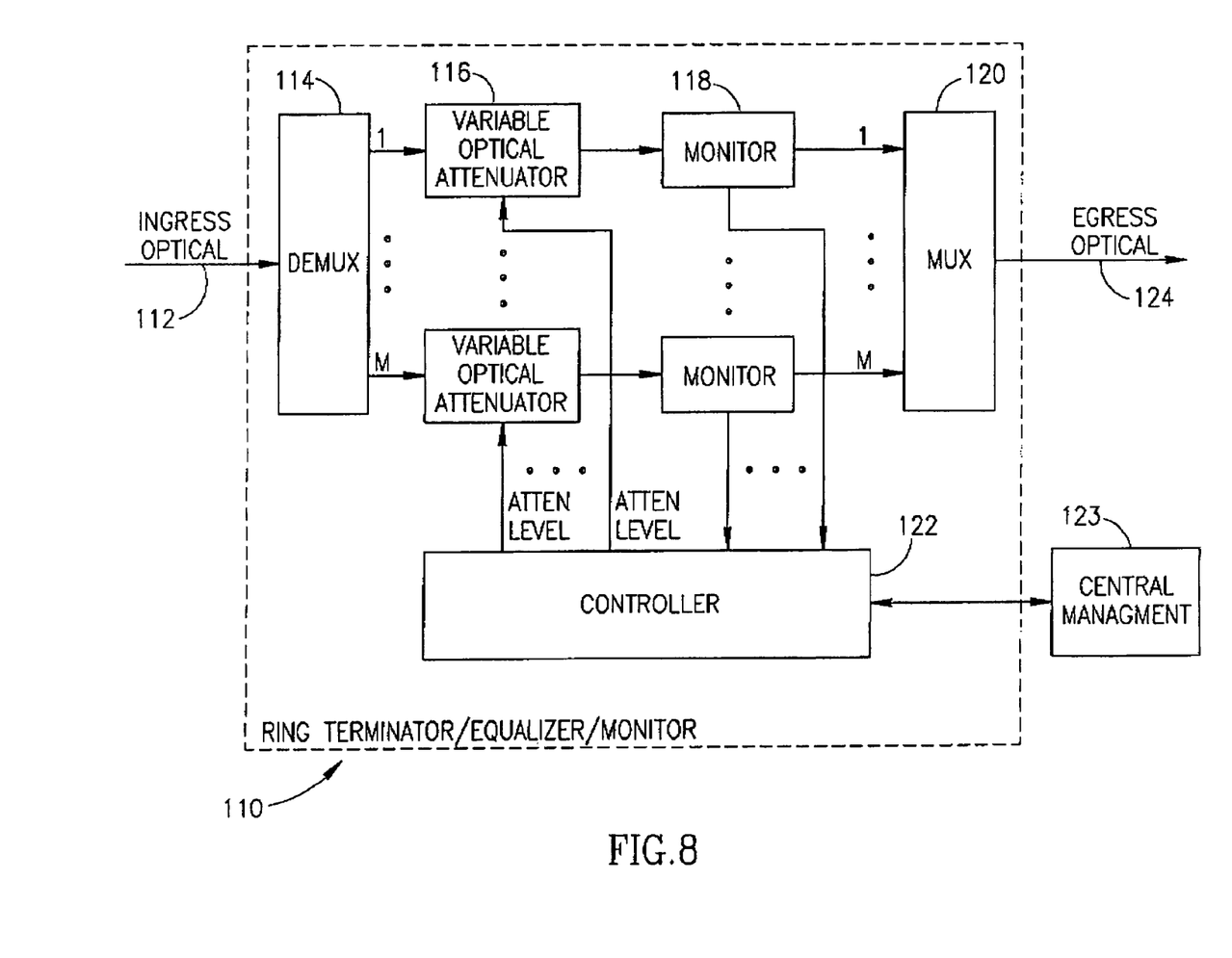
FIG. 8 is a block diagram illustrating the optical network terminator of the present invention adapted to provide gain equalization, monitoring and remote enable/disable capabilities.

A block diagram illustrating the optical network terminator of the present invention adapted to provide gain equalization, a monitoring and remote enable/disable capability is shown in FIG. 8. The modified optical network terminator, generally referenced 110, comprises a demultiplexer 114 and multiplexer 120 as in the first embodiment of FIG. 6, but also comprises additional components to enable functions such as line equalization, line monitoring and remote line disconnection.

In particular, the optical network terminator 110 comprises a plurality of optical attenuators 116 adapted to have variable levels of attenuation that can be controlled electrically, a plurality of line monitors 118 and a controller 122.

In accordance with the present invention, a means for equalizing the optical power of each channel is provided. Equalization of the channels is achieved using the variable optical attenuators 116 and monitors 118 placed in line with each channel. The attenuators 116 are controlled by the controller 122. The controller is adapted to generate an input to each attenuator for setting the attenuation level. The measurement output of each monitor 118 is input to the controller 122.

In one embodiment, the controller comprises a processor or central processing unit (CPU) such as a digital signal processor (DSP), microcontroller, microprocessor or microcomputer and static read only memory (ROM) and dynamic main memory or random access memory (RAM) all in communication with the processor. The processor is also in communication, via suitable control and data lines, with the plurality of attenuator and line monitors.

The controller 122 is adapted to control and maintain the operation of the system optical network terminator. The control may also comprise a magnetic storage device for storing application programs and data. The system may also comprise a computer readable storage medium, which may include any suitable memory means including but not limited to magnetic storage, optical storage, semiconductor volatile or non-volatile memory, biological memory devices, or any other memory storage device.

In accordance with the invention, the optical network terminator is adapted to perform line equalization whereby the power level of each channel is measured using the channel monitor and any adjustments are made via the attenuator associated with that channel. Line monitoring can also be performed without equalization, where it is required to obtain optical power measurements of all channels. Note that channel monitoring can also be performed without equalization, where it is required to obtain optical power measurements of one or more channels.

The invention also enables the remote disconnection of one or more channels from the optical ring. An optical channel is 'disconnected' from the ring by increasing the attenuation of its corresponding attenuator high enough such that the channel is effectively removed from the ring. Removing unused channels helps to reduce the associated noise and the cross talk between the channels that are in use on the ring. The ability to remove a channel remotely is realized using the ability to set the level of attenuation of the attenuators electrically.

Rather than requiring the physical capping off of unused channels, the present invention enables the removal of unused channels remotely, such as from a central management center 123 employed to monitor and control one or more optical ring networks.

The controller is programmed with suitable software that is constructed to perform the line equalization, line/channel monitoring and remote channel(s) disconnect method of the present invention. The controller software is adapted to reside on a computer readable medium, such as a magnetic disk within a disk drive unit, e.g., hard disk drive media, floppy drive media, etc. Alternatively, the computer readable medium may comprise a floppy disk, Flash memory card, EEROM based memory, bubble memory storage, ROM storage, RAM storage, etc. The controller software may also reside, in whole or in part, in the static or dynamic main memories or in firmware within the processor of the computer system (i.e. within microcontroller, microprocessor or microcomputer internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

When utilizing the optical network terminator of the present invention to perform line equalization, it is preferred that any of the optical demultiplexer and multiplexer types used in the optical network terminator have similar optical characteristics as the optical components used in the multiplexers (add/drop or otherwise) within the nodes along the ring.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A wave division multiplexed (WDM) optical ring network, comprising:
    a plurality of nodes coupled to form an optical ring, wherein a portion of said nodes employs one or more optical amplifiers that add unwanted noise to an optical signal, said optical signal including in-use channels and unused channels whereby said unused channels potentially circulate said accumulated noise infinitely around said optical ring;
    an optical network terminator for removing said noise accumulation from said optical signal, wherein said optical network terminator comprises:
        an optical demultiplexer operative to demultiplex said WDM optical signal into a plurality of optical channels having different wavelengths including in-use channels and unused channels;
        means for attenuating said unused channels thereby preventing the infinite circulation of noise accumulation around said optical ring;
        a plurality of monitors, each monitor coupled in-line to an optical channel, said monitor operative to measure the optical power of a respective channel in response thereto, determine whether a channel is in-use or unused; and
        an optical multiplexer optically coupled to the output of said plurality of monitors, said optical multiplexer operative to multiplex said optical channels to generate an output optical signal therefrom with noise accumulation removed.

2. The network according to claim 1, wherein said optical demultiplexer is operative to generate eight channels corresponding to eight different wavelengths.

3. The network according to claim 1, wherein said optical multiplexer is operative to multiplex eight channels corresponding to eight different wavelengths.

4. The network according to claim 1, wherein said optical ring terminator is adapted to be transparent to the bit-rate of each individual optical channel.

5. The network according to claim 1, wherein said optical ring terminator is adapted to be transparent to the protocol of each individual optical channel.

6. The network according to claim 1, wherein said optical ring terminator is adapted to provide remote enabling/disabling of individual optical channels.

7. The network according to claim 1, wherein said optical ring terminator is adapted to enable the gain equalization of said plurality of optical channels.

8. The network according to claim 1, wherein said optical ring terminator is adapted to enable in-line monitoring of power level of said plurality of optical channels.

* * * * *